United States Patent [19]

Perkins

[11] Patent Number: 5,116,550
[45] Date of Patent: May 26, 1992

[54] METHOD OF MAKING BIODEGRADABLE FREE FILL FOAM PACKING MATERIAL

[76] Inventor: Newton B. Perkins, 10 Halsey Dr., Brick, N.J. 08723

[21] Appl. No.: 499,647

[22] Filed: Mar. 27, 1990

[51] Int. Cl.⁵ .............................. B29B 9/06; B29B 9/16
[52] U.S. Cl. ........................................ 264/12; 264/54; 264/142; 264/330
[58] Field of Search ...................... 264/11, 12, 13, 14, 264/46.1, 5, 51, 140, 54, DIG. 17, 142, 330; 425/4 R, 7

[56] References Cited

U.S. PATENT DOCUMENTS

| | | | |
|---|---|---|---|
| 2,576,977 | 12/1951 | Stober | 264/13 |
| 3,070,837 | 1/1963 | Loertscher et al. | |
| 3,397,258 | 8/1968 | Williams | |
| 3,400,037 | 9/1968 | Sare et al. | |
| 3,450,253 | 6/1969 | Nielsen | |
| 3,551,947 | 1/1971 | Jennings | 264/51 |
| 3,651,182 | 3/1972 | Rosenthal | 264/51 |
| 3,667,593 | 6/1972 | Pendleton | |
| 3,723,237 | 3/1973 | Fuss | 264/51 |
| 3,771,929 | 11/1973 | Hellman et al. | |
| 3,832,430 | 8/1974 | Noziere | 264/51 |
| 3,927,162 | 12/1975 | Stalter, Sr. | 264/51 |
| 3,961,000 | 6/1976 | Ropiequet | 264/45.5 |
| 4,042,658 | 8/1977 | Collins | |
| 4,104,440 | 8/1978 | Collins | |
| 4,156,759 | 5/1979 | Hostettler | |
| 4,272,572 | 6/1981 | Netherly | |
| 4,606,965 | 8/1986 | Bussey | |
| 4,616,055 | 10/1986 | Mason | 264/45.1 |
| 4,863,655 | 9/1989 | Lacourse et al. | |
| 4,960,547 | 10/1990 | Reinhard | 264/11 |

Primary Examiner—James Lowe
Attorney, Agent, or Firm—James Creighton Wray

[57] ABSTRACT

Biodegradable free fill expanded polyurethane foam packing materials are formed by pumping liquid starch or sugar, diisocyanate, polyols and a catalyst into a mixing head. The mixture is released from an exit port in the mixing chamber as a sticky material. At predetermied intervals air blasts chop the sticky material mass from the exit port. The material beings expanding as it drops through a curing chamber against upward warm air currents. When the materials expand to full size and dry to a non-tacky surface, the materials are released from the chamber and collected for use as packing materials. The materials have a bionutrient starch or sugar content of about 40% or more, making them readily biodegradable by microbes. The polyurethane components are broken down into very small sizes and convert to urea, making the products highly suitable for disposal in landfills and as soil amendment and fertilizers.

9 Claims, 2 Drawing Sheets

METHOD OF MAKING BIODEGRADABLE FREE FILL FOAM PACKING MATERIAL

BACKGROUND OF THE INVENTION

The present invention concerns loose fill packing materials.

The most common packaging, wadding or fill used in cardboard containers is old newspapers. The most commercially marketed product is extruded or molded polystyrene blocks or shapes, which are typified by the recognized peanut design. The peanut shapes are some of the most widely known and accepted packing material and have been for many years.

There are decided disadvantages to the world's environment by the continued use of polystyrene shapes. The polystyrene shapes are reputed to have a half-life of more than 400 years, and possibly as long as 1,000 years. The shapes are lethal when eaten by wildlife. They float upon water, and being very light, they disperse with the speed of wind. The shapes generate static electricity, and special treatment is required when the polystyrene shapes are used to package electronic materials, which may be susceptible to damage by the packing material-generated static electricity.

A disadvantage of the polystyrene shapes is that they may be broken into small pieces, but the small pieces have the same half-life. Photo or UV reactive additives may be added to the polystyrene to make it break up into smaller pieces upon exposure of months or years to light. However, the pieces will not degrade, and have the same 400 to 1,000 year half-life as the major polystyrene shapes.

Packaging materials using polyurethane have been made by the inventor for more than a year. Such materials are made by separately dispensing two components (A and B) into a bag and hand kneading the bag to begin the reaction of the components, and then placing the bag in a box, followed by placing the article to be protected in the box, followed by another bag filled with the same packaging materials. The urethane foam made by the two starting materials expands to fill the box around the protected article with highly satisfactory shipping results. The inventor has identified that device as "PILLOW-PAK".

Some professional packers continue to use polystyrene peanuts or other shapes, such as extruded figure eight shapes, with the attendant environmental damage.

Unlike polystyrene, polyurethane has a short half-life, and eventually disintegrates into a suitable soil amendment.

The urethane foam produced by the inventor is based on a two-component system, which contains a polyisocyanate component, component A, and a polyol and catalyst component, component B. Both components are commercially available.

Component A is preferably a polymeric methylene diphenyl diisocyanate. Component B is primarily an activator for component A, which includes polyols, water and catalytic agents.

The two components react to produce polyurethane. Polyurethane is described as a class of synthetic resinous fibrous or elastomeric compounds belonging to the family of organic polymers made by the reaction of diisocyanates (organic compounds containing two functional groups of structure-NCO) with other difunctional compounds, such as glycols.

The best known polyurethanes are flexible foams, which are widely used as upholstery material, mattresses and the like. The polyurethanes of the present invention are rigid foams, such as those well known and used for insulation and for lightweight structural elements as cores for airplane wings and boat hulls.

Foamed polyurethanes result from the reaction of diisocyanates with organic compounds which are usually polyesters containing carboxyl groups. The reactions liberate bubbles of carbon dioxide and water vapor.

The fibers and foams generated by the reaction are usually white with dull luster, and are readily dyed. They absorb very little moisture. The great advantage to polyurethane is that it may be broken into small pieces which have a relatively short half-life, and which operate suitably as a soil amendment. If ingested by animals in reasonable quantities, it is believed to be substantially harmless.

While the polystyrene shapes have been marketed as loose packing materials for a long time and the bagged polyurethane foams have been coexistent for a shorter time, there has been no move as far as is known to make the polyurethane foam in small shaped, free-flow fill dunnage material, similar to the well known polystyrene shapes.

The prior art has included amylaceous materials in polyurethane foams in conjunction with stabilizing agents and anti-oxidants primarily for use as extenders. The prior art has used corn starch, corn flour and gelatinized corn flour, as well as acid-hydrolyzed gelatinized corn flour in conjunction with the stabilizing agents and anti-oxidants as extenders for the urethane foam. The starch has been mixed with the polyesters prior to foaming the foams. In other cases, the starch has been added to a completely reacted liquid reaction product of the polyester and diisocyanate, and has been added to liquid prepolymer formed by reacting organic polyisocyanate with a polyether or polyester. Carbohydrate fillers in polyurethane foams have been described as having relatively high functionality. Complex steps for including oxyalkylated starches and the use of starch-based polyols have been described in prior art. Phosphorous derivatives of starch polyethers have been used to give polyurethane foam flame-retardant capabilities.

Polyurethane foams containing stabilized amylaceous materials, which have been stabilized by treating with a stabilizing agent or by removing substantially all, or at least a major portion, of the oxidizable materials, have been described.

A recent patent describes the use of substantially pure starch with a high amylose content in an expanded form as a substitute for polystyrene peanuts.

None of the prior art has suggested use of such starch-extended foams as packing agents, and none have suggested simplified methods of including the starch in the foam.

A need for a better biodegradable free fill expanded foam packing material persists.

SUMMARY OF THE INVENTION

The present invention is directed to fill that need.

The invention has surprisingly found that a high quality, biodegradable free fill expanded foam packing material may be produced. Biodegrading of the polyurethane is enhanced and accelerated by including the bionutrient starch.

In a preferred embodiment, the process system includes six parts, which make up the whole integrated process. Some variables can be made in each of the parts without changing or substantially affecting the output and quality of the product.

The storage and delivery area accepts delivery of the three raw materials from tanks or drums. Each storage tank holds 4,000 to 8,000 gallons, and three are needed. All material is stored at ambient work space temperature. A modular system may be produced using fifty gallon drums.

In the delivery phase, moderate pump pressures move the materials from storage to the mixing dispenser head. Pressure is varied according to daily production variables of product size and shape and is obtained by means of a pump in each line.

Prior to entering the dispenser head, the material is heated to about from 90° F. to 140° F. by means of heaters surrounding the input piping. The head is also heated to prevent cooling of the material before mixing takes place.

The dispenser mixing head mixes materials before release. The liquid materials are delivered to the input ports of the head through restricting nozzles to increase the delivered speed of the material, to induce mixing and to initiate the foaming reaction of the isocyanate and polyols and the starch or sugar formulation. Size of the nozzle opening and volume regulation by means of piping valves allow the operator to adjust the swirling/mixing and the start of the reaction of the pre-heated materials with each other in the dispenser head.

Total input to the dispenser head is in the order of less than 3 GPM.

The input pressures of all three delivery pipes swirl, mix and deliver the mixture through to the exit port which delivers a constant stream of foaming mixture through an extrusion orifice of approximately ¼" to ⅜" diameter.

The air chopper is a rotary interrupter with variable speed, and variable apertures or slits, in sizes, shapes and spacings to cause air blasts for cutting or chopping the exit extrusion; direction of rotation is not important.

From the vertical drop of the exit port, the chopper is positioned to interrupt an air-stream perpendicular to the exit port. The openings or slits in the disc/dish cut or break off the foaming stream into large pea-sized pieces which are expanding during the hardening process. Expansion is from 65:1 to 130:1 in volume, depending upon the product being produced.

The curing tower is a cylindrical enclosure with a variable speed lift fan in the bottom for directing a warm upward stream of air to slow the dropping and expanding shapes until they are hardened and are no longer tacky or sticky. Air flow is regulated to slow the dropping of the expanding and expanded shapes for a duration of 5 to 10 seconds.

The tower is enclosed to provide a slight internal pressure differential. This factor serves to direct and discharge the expanded shapes from the tower.

The storage and packing area is important to this process.

A critical balance is needed due to the volumetrical differential of the input to the output. The input materials increase 65 to 130 times in volume when going through the process.

At the rate of about 3 GPM input, an output of about 460 ft³/min of finished product has to be taken away, packed and delivered to storage.

Coordinating controls slow down and speed up or vary the entire system as needed. A control station to vary each dependent part of the operation is installed at the operator's position.

The expansion factor is so large that variable controls in the line is desired.

This invention manufactures easily recognized replacements for currently used polystyrene peanuts, packing, fill or wadding that naturally degrades in currently used disposal methods.

Since the present product does not generate static electricity, it is desirable for the packing of electronic components.

The unique process produces polyurethane biodegradable, free fill foam packaging shapes for the protection of fragile items during shipment. The material replaces polystyrene peanuts, and can be discarded after use with common methods of disposal, without harm to the environment.

The process can vary the amount of starch or sugar by a large margin and not substantially affect the quality of the foam. The range of starch amendment is as broad as possible around a preferred 40%.

Different micro-organisms eat more if they are richer, others eat more if the starch content is lean or sparse.

A preferred method of making a free fill foam expanded packing material includes flowing liquid A and B components separately to A and B nozzleheads, heating the A and B components to about 90° F. to 140° F., mixing the A and B components in a heated swirl chamber, releasing material from the swirl chamber through an opening and chopping flow from the opening and thereby forming shapes. The method includes expanding the shapes in an expansion chamber, dropping the expanding shapes in the expansion chamber, and slowing fall of the expanding shapes with upward air currents from a lift fan, moving the fully expanded shapes from the expansion chamber and storing the expanded shapes.

The preferred method further includes flowing a bionutrient material to the injection heads, mixing the bionutrient material with the A and B components in the swirl chamber, and releasing the mixed bionutrient and the A and B components and chopping the released material into shapes in the expansion chamber.

One method further adds a bionutrient component to the B component, mixes the B component and the bionutrient, and releases the mixed B component and bionutrient into the swirl chamber for mixing with the A component.

The preferred method of chopping includes releasing the material from the swirl mixing chamber through an exit port and moving plural orifices laterally across an air blast tube beside the exit port.

The preferred method of chopping blows cyclic air blasts across the exit port of the extruder to separate shapes from the extruder.

One preferred method of forming loose free fill foam expanded packing material includes feeding A and B components separately to between about 90° F. and 140° F., feeding a bionutrient starch, flowing the B component and bionutrient starch mixture to a nozzle, flowing the A component to a nozzle, releasing the B component and starch mixture and the A component toward each other from the nozzle. The method includes periodically chopping the mixed components from the nozzles with sequential air blasts, moving the chopped particles into an expansion chamber and expanding the particles within the expansion chamber, controlling movement of the particles in the expansion chamber with a lift fan, and withdrawing fully expanded particles from the chamber.

A preferred manufacturing apparatus for biodegradable free fill polyurethane foam expanded packing materials includes an expansion chamber and a mixing head connected to the chamber. The mixing head comprises component input nozzles, component input lines connected to the nozzles, and pumps connected to the component input lines. These separately supply a diisocyanate component A to the nozzles, an initiator and catalyst or blowing agent component B to the nozzles, and a bionutrient component X to the nozzles. These components form mixed sticky product globules at an exit of the nozzles. An air blast pipe is positioned adjacent the exit, and a blast controller is connected to the pipe for delivering air blasts at intervals to remove predetermined globules from the exit. A fan is connected to the chamber for directing warm air at the dropping globules and for supporting the globules as they expand in ball-like shapes and dry to a tack-free surface. Removal means removes expanded tack-free globules from the expansion chamber.

A preferred biodegradable free fill polyurethane foam expanding packing material comprises ball-like shapes of expanded polyurethane foam having a uniformly dispersed bionutrient plant starch.

These and further and other objects and features of the invention are apparent in the disclosure, which includes the above and ongoing written specification, with the claims and the drawings.

DETAILED DESCRIPTION OF THE DRAWINGS

Figure 1:
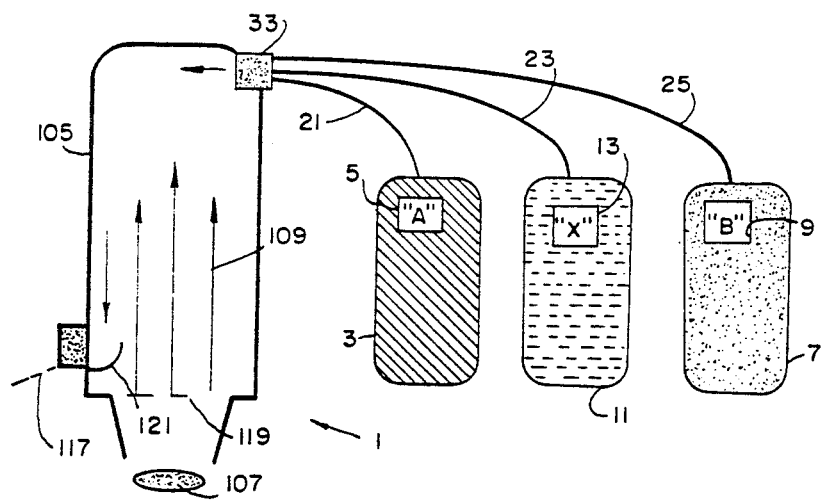
FIG. 1 is a schematic detail of an apparatus for carrying out the method of the invention.

Referring to FIG. 1, an apparatus for manufacturing the biodegradable polyurethane free fill foam expanded packing material is generally indicated by the numeral 1. Tank 3 holds a flowable liquid polyisocyanate 5, which may be any suitable material such as a diisocyanate material referred to as the A component.

Tank 7 holds the B component 9, which is a polyol and catalyst, or blowing agent.

The polyol may be any suitable polyester such as described in the prior art, including a mixture of aliphatic and cyclic acids, such as adipic and phthalic acids and a triol, such as glycerol or trimethylol propane, or any other suitable polyester or initiator.

Since the reaction is exothermic, the catalyst or blowing agent may be water.

Tank 11 holds bionutrient referred to as the component X. The bionutrient may be starch or sugar of any convenient or suitable form. The starch may be any plant source starch, including corn starch for example. The sugar may be any available and relatively inexpensive sugar, or may be glucose. Preferably the nutrient is in a thick, aqueous, pumpable solution.

The individual components are separately pumped by pumps 15, 17 and 19 through lines 21, 23 and 25 into nozzles 27, 29 and 31 in mixing head 33. The components are mixed in a swirl chamber 35, which may include surface irregularities, baffles or chain links to promote the mixing of the components.

In a preferred form, the pumping rates of pumps 15, 17 and 19 are controlled to flow equal portions of components A and B into the mixing head 33, and to flow a larger portion of the component X into the mixing head. Suitable portions are, for example, by volume, 20% component A, 20% component B, and 60% of the bionutrient. Other suitable quantities are, for example, 35% component A, 35% component B, and 30% of the bionutrient, for example. A preferred proportion is 30% by volume of components A and B, and 40% of the bionutrient. Lines 21, 23 and 25 are heated to a temperature between 90° F. and 140° F., and the mixing head 33 is preferably heated to the same temperature. Exothermic reactions of the products may begin in the mixing head so that the mixing head requires little or no heat, depending on the speed of the materials moving through the mixing head. The mixing head 33 is removable from the lines 21, 23 and 25, as schematically represented by the connectors 37, 39 and 41. Quick connectors are preferred. The entire mixing head is removed from the connectors at the end of the product run, and the mixing head is soaked in solvent to prepare for its next use. Any suitable organic solvent may be used.

An exit port 43 is provided at the outer end of the mixing chamber 35. The exit port is connectable by a connector 45 to the mixing head 33 so that the port may be removed and separately cleaned, and may be replaced with ports of varied orifice size and shapes. A round port approximately 1/16" to 3/16" diameter is preferred. Spaced slightly from the exit port so that the released material 47 makes no contact is an air blast control disc 49. The disc has openings 51 which control blasts of air from an air tube.

In a preferred embodiment, the apertures 51 are positioned near the release port 43, and an air tube is directed through the aperture toward the release port 43 at a slight downward angle to blow away the released material 47 after a suitable length of the material 47 is expressed from the release port. The solid spaces 53 on the disc, and the interrelationship of the solid spaces 53 and the apertures 51, control the interval between the chopping blasts.

As shown in FIG. 1, the line 23 leading from pump 17 may be larger than lines 21 and 25 which carry components A and B, so that the starch may be delivered to the mixing head 33 at a rate which is higher than the rate of delivery of components A and B.

Figure 4:
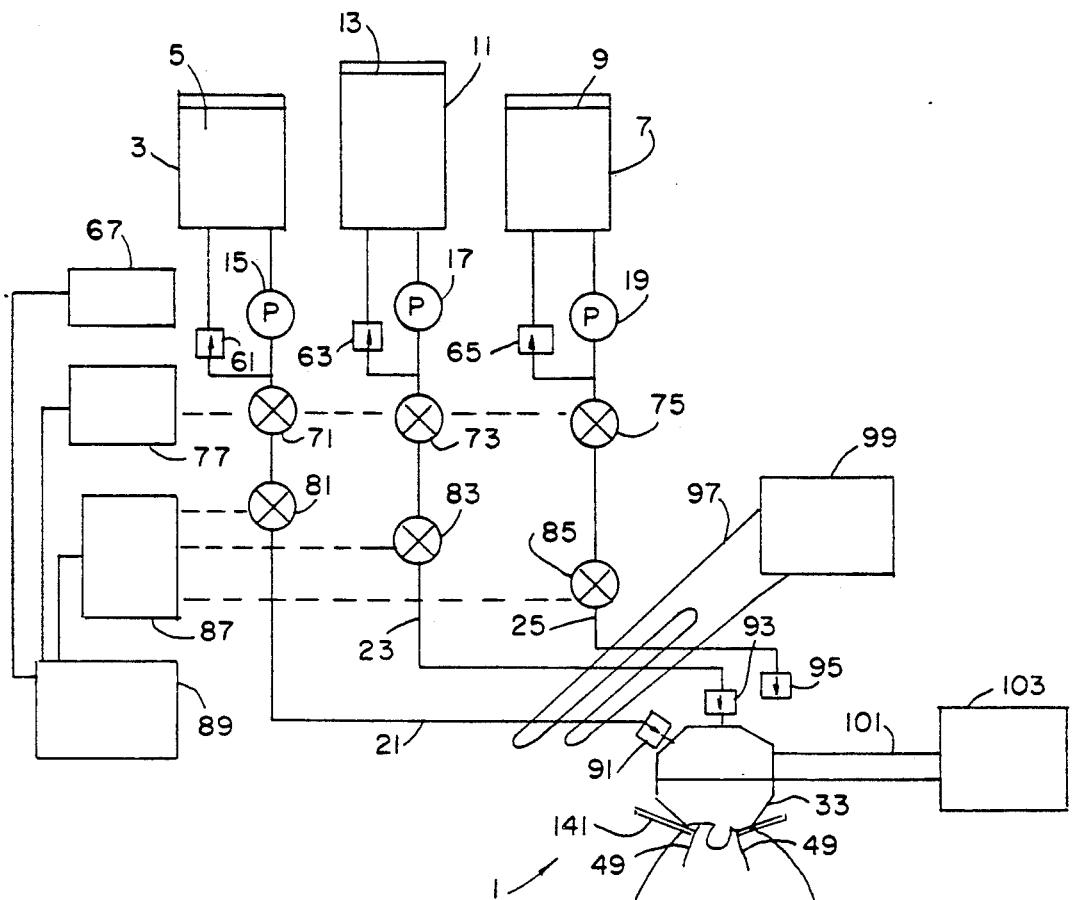
FIG. 4 is a schematic representation of the apparatus and controls used with the present invention.

The system and its controls are schematically shown in FIG. 4.

Release valves 61, 63 and 65 open to return the material to the respective tanks upon overpressure of the pumps. Speed of the pumps is controlled by a controller 67. Shut-off valves 71, 73 and 75 are controlled by a controller 77. Metering valves 81, 83 and 85 are controlled by a proportion controller 87. The shut-off controller, proportion controller and pump controller may be interconnected to a system control 89. Check valves 91, 93 and 95 are provided to prevent return flow into the lines from the mixing head 33. The lines are provided with individual heating coils, which are schematically represented at 97. A controller 99 controls the temperature in the heating coils to provide uniformly warmed products to the mixing head 33. The mixing head is provided with a heater 101 controlled by controller 103 to maintain the mixing temperature at a predetermined level.

Figure 2:
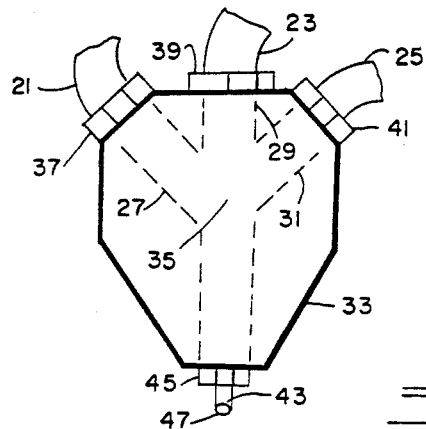
FIG. 2 is a detail of a mixing chamber.
Figure 5:
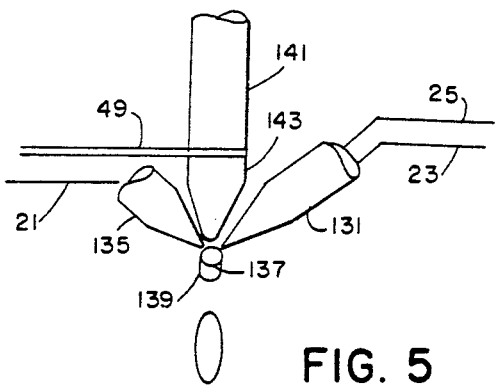
FIG. 5 is a schematic representation of an alternate form of the invention.
Figure 3:
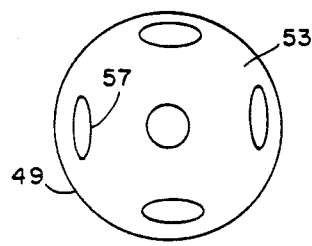
FIG. 3 is a detail of a chopping air blast interruptor.
Figure 6:
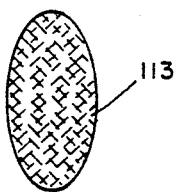
FIG. 6 is a representation of the product having a teardrop shape.

Tower 105 is supplied with a fan 107 at its base to provide a vertical air current 109, as shown in FIGS. 1 and 5, to retard the falling of the expanding shapes 111, which are generally referred to as balls. The actual shape may be egg-shaped or generally teardrop-shaped 113, as shown in the detail of FIG. 6. The length of the tower and the air current are sufficient to retard the dropping s that the balls 111 spend from 5 to 10 seconds within the tower to fully expand and to dry to a tack-free surface 115. The balls fall out of the tower into a collection area 117, where the balls are packed, such as, for example, in large plastic bags. Screen 119 prevents the balls from contacting the fan. Guides 121 may be provided to encourage the balls to flow to the discharge opening 123, and air currents may be supplied through directing nozzles 125 to aid the movement of the fully expanded and tack-free balls. Exhaust air from the chamber 105 may be directed to aid the movement of the final balls.

In one preferred form of the invention, the low speed fan provides an air differential pressure of about ½ pounds per square inch, and the chamber is approximately 25 feet high.

In an alternate form of the invention as shown in FIG. 5, two material-ejecting nozzles 131 and 135 are connected to feed lines for the components. Nozzle 131 is connected to lines 23 and 25 to premix the A and B components before ejection from the nozzle. Nozzle 135 is connected to line 21 to eject the A component. The nozzles 131 and 135 direct the components into contact with each other, forming a globule 137 of the component, which swells 139 to the desired size before disc 49 aligns an aperture with air blast pipe 141 to direct an air blast through nozzle 143 and to blow the globule 139 from the nozzles 131 and 135.

The freed globule 139 drops and expands and floats downward on the warm air stream until it is fully expanded and surface dried to a tack-free condition, whereupon it is exhausted from the chamber 105 and collected.

While the invention has been described with reference to specific embodiments, modifications and variations of the invention may be constructed without departing from the scope of the invention, which is described in the following claims.

I claim:

1. The method of making a free fill foam expanded packing material, comprising flowing liquid A and B components separately to A and B nozzleheads, heating the A and B components to about 90° F. to 140° F., mixing the A and B components in a swirl chamber, releasing material from the swirl chamber through an opening and chopping flow from the opening and thereby forming shapes, expanding the shapes in an expansion chamber, dropping the expanding shapes in the expansion chamber, removing the fully expanded shapes from the expansion chamber and storing the expanded shapes.

2. The method of claim 1, further comprising flowing a bionutrient material to the nozzleheads, mixing the bionutrient material with the A and B components in the swirl chamber, and wherein the releasing comprises exiting the mixed bionutrient and the A and B components and chopping the released material into shapes in the expansion chamber.

3. The method of claim 1, further comprising adding a bionutrient component to the B component, mixing the B component and the bionutrient, and releasing the mixed B component and bionutrient into the swirl chamber for mixing with the A component.

4. The method of claim 1, wherein the chopping comprises releasing the material from the swirl mixing chamber through an exit port and moving plural orifices laterally across an air blast tube beside the exit port.

5. The method of claim 4, wherein the chopping further comprises blowing cyclic air blasts across the exit port.

6. The method of claim 1, wherein the chopping comprises blowing timed air blasts across the extruder to separate shapes from the extruder.

7. The method of claim 1, wherein the flowing comprises flowing about 30% A component, about 30% B component, and about 40% bionutrient.

8. The method of claim 1, wherein the flowing comprises flowing together about 20% to 35% A component, about 20% to 35% B component, and about 30% to 60% bionutrient.

9. The method of forming loose free fill foam expanded packing material, comprising feeding A and B components separately to between about 90° F. and 140° F., feeding a bionutrient into the B component flowing the B component and bionutrient mixture to a first nozzle, flowing the A component to a second nozzle, releasing the B component and starch mixture and the A component toward each other from the nozzles, and periodically chopping the mixed components from the nozzles with sequential air blasts, moving the chopped particles into an expansion chamber and expanding the particles within the expansion chamber, and withdrawing fully expanded particles from the chamber.

* * * * *